Dec. 12, 1967   L. J. HOLLANSZKY ET AL   3,357,721
IDENTICAL HALF COUPLING WITH FLUID PRESSURE SEAL
Filed Aug. 30, 1965   3 Sheets-Sheet 1
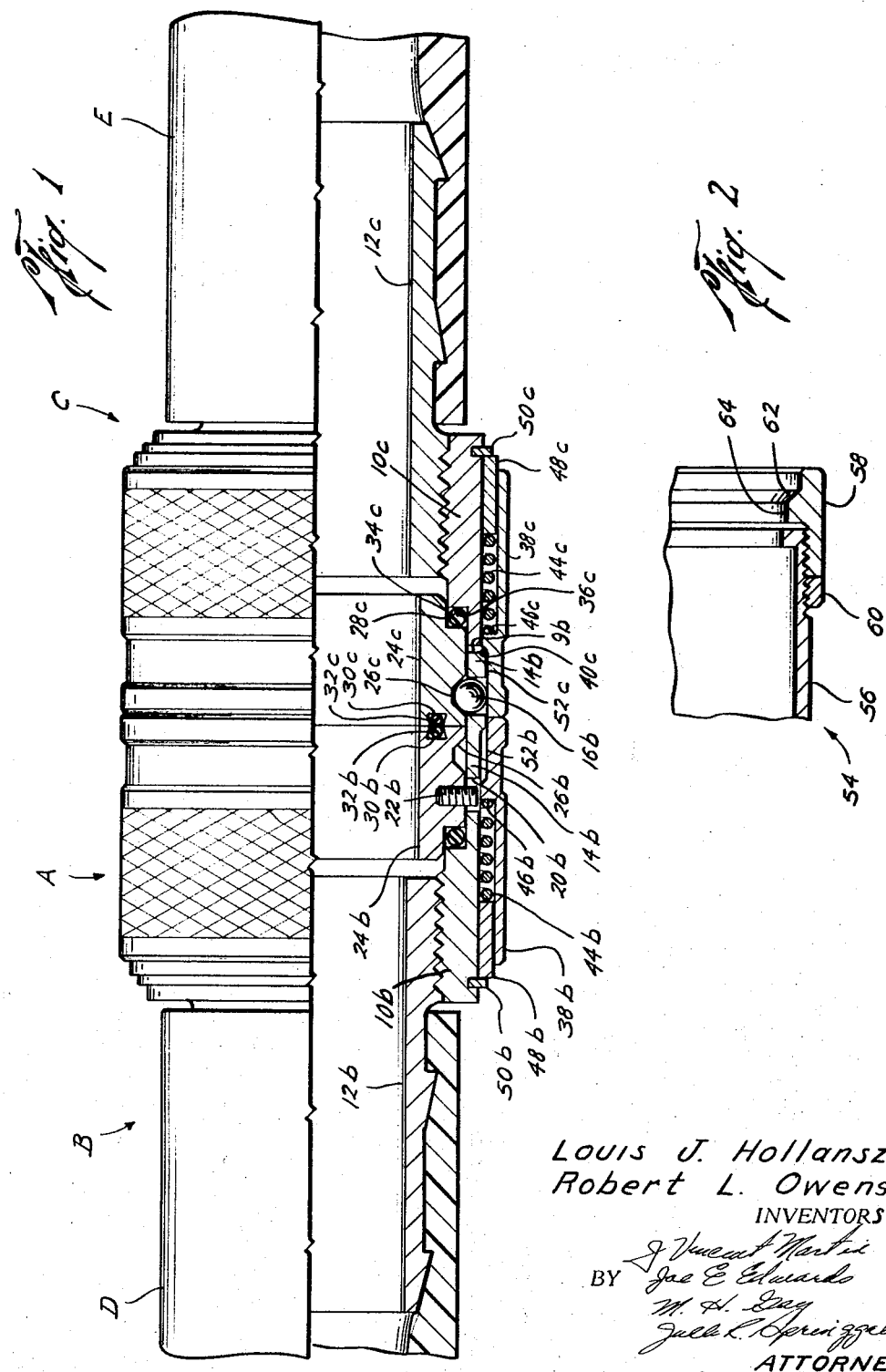
Louis J. Hollanszky
Robert L. Owens
INVENTORS
BY
ATTORNEYS

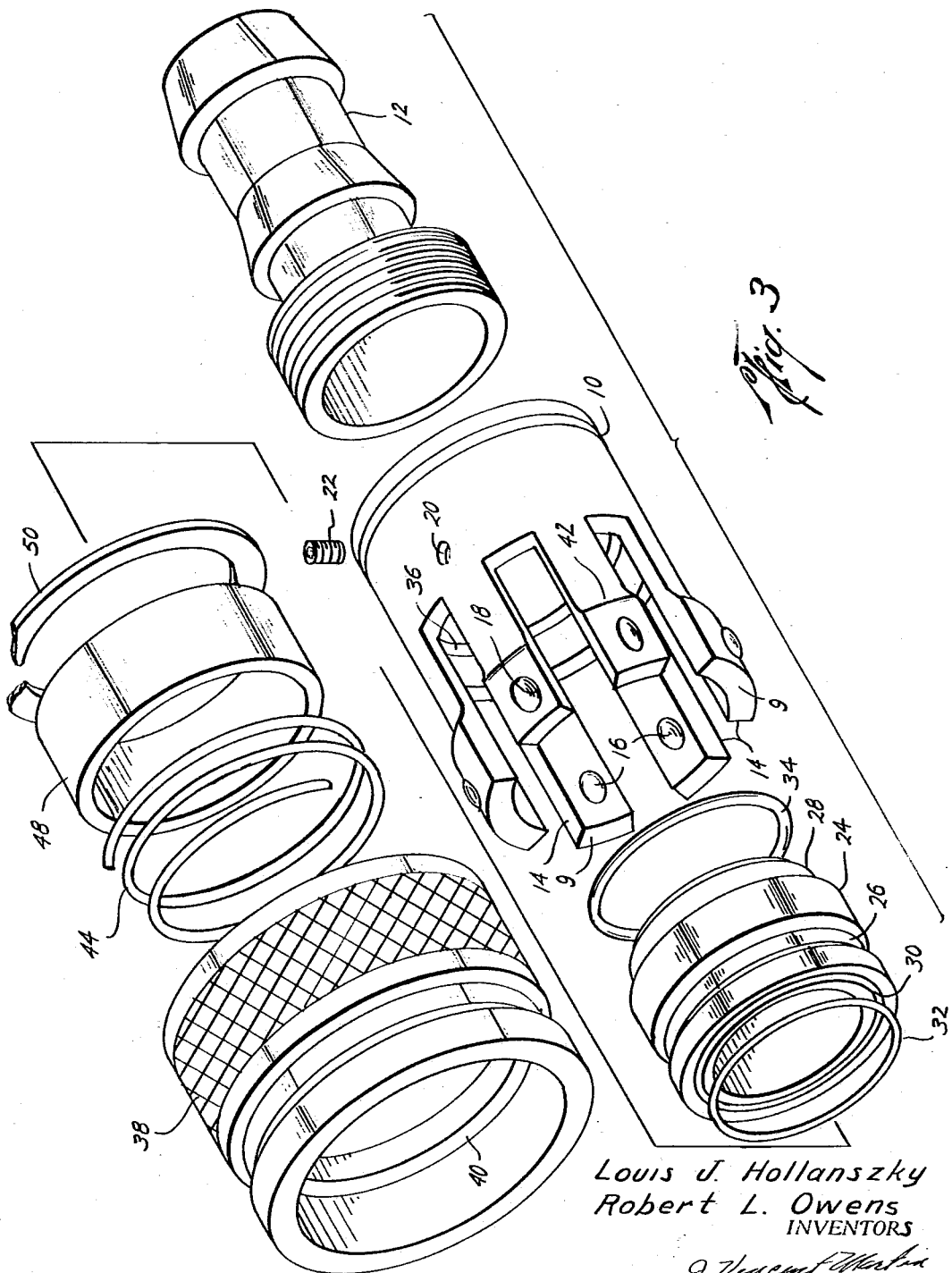

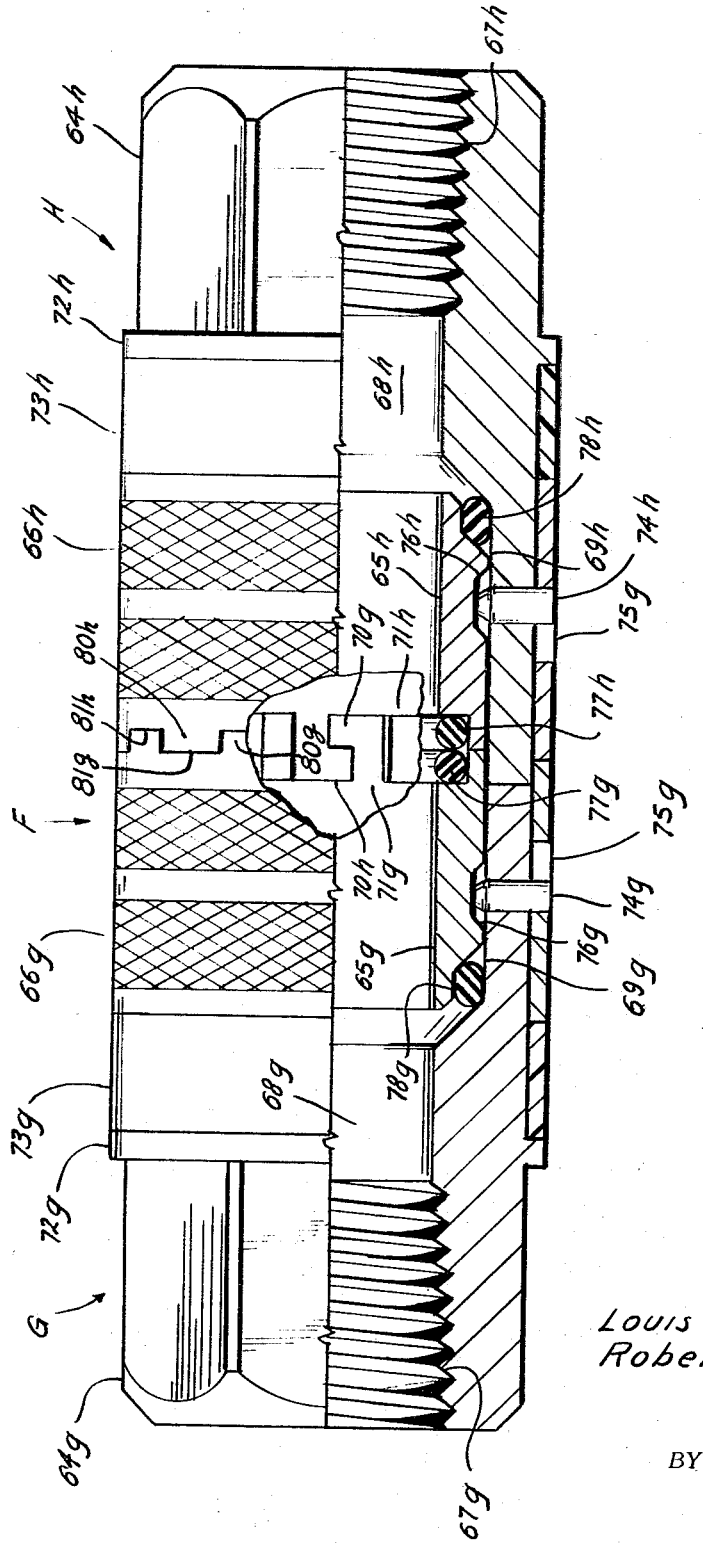

United States Patent Office 3,357,721
Patented Dec. 12, 1967

3,357,721
IDENTICAL HALF COUPLING WITH FLUID PRESSURE SEAL
Louis J. Hollanszky and Robert L. Owens, Houston, Tex., assignors, by mesne assignments, to White Manufacturing Company of Missouri, Houston, Tex., a corporation of Missouri
Filed Aug. 30, 1965, Ser. No. 483,517
8 Claims. (Cl. 285—1)

ABSTRACT OF THE DISCLOSURE

A quick release pipe coupling having a pair of identical halves each with a bore therethrough, an axially movable sleeve member sealingly mounted in each bore, mutually engageable sealing surfaces on the forward end of each sleeve, engaging fingers carrying ball detents on each coupling half, which detents engage a groove in the opposite sleeve member, and a slidably mountd locking sleeve on each coupling half for holding the ball detents in engaging position. The forward ends of the axially movable sleeve members are urged axially into tighter sealing contact by the fluid pressure within the bores.

---

The present invention relates to a coupling providing a connection between two tubular members and in particular a coupling providing a seal to prevent leakage of fluids flowing through the coupling.

Many couplings have been used in the past which are readily connected and disconnected and which will provide a seal for the fluids flowing through them. It has been noted, however, that such prior couplings have a tendency to leak when they are subjected to forces tending to pull the two body members apart.

An object of the present invention is to provide a coupling in which as the forces tending to separate the coupling increase, the sealing forces are also increased.

Also, an object of the present invention is to provide a coupling which is readily releasable and which will seal even when subject to forces tending to separate the body members.

Another object of the present invention is to provide a coupling having a seal responsive to pressure so that an increase in pressure in the coupling increases the force maintaining the seal.

Another object of the present invention is to provide a coupling assembly of two body members together with sealing means which is urged toward sealing position by a force tending to pull the body members apart.

A further object of the present invention is to provide a coupling having sealing means which is reinforced by forces tending to pull the coupling apart.

Still another object of the present invention is to provide a coupling having two identical subassemblies which are readily connected and disconnected and to provide an improved seal to retain fluids flow therethrough under pressure.

Another object of the present invention is to provide an improved coupling including two mating body members and a seal member assembled with each body member, in which the body members engage the seal member of the mating body member whereby a force tending to pull the body members apart will tend to force the sealing members together in tighter sealing engagement.

A still further object is to provide a coupling assembly having two identical subassemblies, each including a floating seal means and a body having engaging means adapted to engage the floating seal means of the other subassembly whereby forces tending to separate said subassemblies will be exerted on said floating seal means to reinforce and maintain the seal of the coupling assembly.

Still another object of the present invention is to provide a coupling assembly having two identical subassemblies, each including a body, means providing engagement between the subassemblies and a floating member which is adapted to be responsive to the pressure contained within the coupling assembly whereby an increase in pressure will increase the sealing forces of the floating member.

These and other objects of the present invention are hereinafter set forth and explained in relation to the drawings wherein:

FIGURE 1 is a quarter sectional view of a coupling assembly constructed in accordance with the present invention;

FIGURE 2 is a partial sectional view of a locking sleeve of a modified form of the present invention;

FIGURE 3 is an exploded view of the components of one subassembly of the coupling of the present invention shown in FIGURE 1; and FIGURE 4 is a quarter sectional view of a modified form of the present invention.

The present invention is an improved coupling in which the forces tending to separate the coupling are utilized to increase the sealing of the coupling. In this coupling, as such forces which tend to separate the coupling are increased, the sealing forces are also commensurately increased to improve the seal of the coupling. In one illustrative example of this utilization of forces, the forces are transmitted from one subassembly to a floating member of the other by suitable engaging means whereby such forces are translated to hold the floating members together in sealing engagement. Another illustrative example of the present invention is where a floating sealing member is provided in each coupling subassembly to seal against the floating sealing member of the other subassembly and in which each floating sealing member has an area exposed to pressure which is not balanced and therefore creates a force holding each floating sealing member against the other to provide a pressure energized seal for the coupling. In another form of the present invention the two above forms of the present invention may be embodied in one structure wherein both the pressure energized seal and the cross engagement between subassemblies are used to utilize forces tending to separate the coupling to improve the seal of the coupling.

Referring more in detail to the drawings, the coupling assembly A as shown in FIGURE 1 includes the mating subassemblies B and C which are identical in construction and are in mating engagement with each other. As shown, the coupling assembly A provides a connection between the tubular members D and E which are both illustrated as rubber hoses by way of example only.

In the form of the invention illustrated in FIGURES 1 and 3, the two subassemblies B and C, being identical, each include a body member, a floating sleeve member and a suitable engaging means on the body member for engagement with a portion of the other subassembly. The body member 10 illustrated in FIGURE 3 is provided with a central bore in communication with the bore through the adaptor means 12 for receiving the tubular members D or E. Adaptor 12 may be provided by a piece of pipe if desired. As shown, the adaptor means 12 is threadedly engaged with the body member 10 and provided with external ridges to engage the tubular members D or E.

The floating sealing sleeve 24 is adapted to be positioned within the enlarged portion of the bore through body member 10 and to be maintained within such bore but being able to move longitudinally therein for a limited distance.

The engaging means in the form illustrated includes the fingers 14 which are circumferentially spaced about the front face of the body member 10 a sufficient distance apart to receive the fingers 14 of a mating subassembly. The fingers are each provided with a hole 18 to receive the balls 16. Each of the holes is provided with a shoulder or ledge at the inner and outer surfaces of the fingers to retain the ball 16 therein without restricting the radial movement of the ball to engage in the ball receiving groove 26 on the exterior surface of the sealing sleeve 24. These shoulders or ledges retaining ball 16 in hole 18 may be made by peening or any other suitable manner. Thus, the fingers 14, the balls 16 and the grooves 26 cooperate to provide a suitable engaging means by which the two subassemlies B and C are cross engaged to form the coupling assembly A.

Suitable guide means is provided to maintain the floating sealing sleeve member within the body member while allowing it to have sufficient floating or longitudinal movement within the body member to accomplish the desired increase in sealing forces to reinforce the seal responsive to pressures within the coupling assembly and also responsive to forces tending to separate the subassemblies of the coupling assembly. In the illustration, such guide means includes the hole 20 in the body member 10 and the set screw 22. The set screw is carried by the floating sealing sleeve 24. The hole 20 is larger than screw 22 and maintains sleeve 24 within the body member 10 while allowing a limited floating or longitudinal movement of sleeve 24 therein. In the illustrated form only one such guide means is shown, but it should be noted that additional guide means for maintaining the floating position of the floating member 24 within the body member 10 may be used if desirable.

Sealing means is provided in the form of the invention illustrated in FIGURES 1 and 3 to seal between confronting faces of each subassembly when joined to form a coupling assembly. Preferably the sealing means is arranged to be urged toward sealing position by pressure in the coupling. Such sealing means 32 is provided within the annular groove 30 on the forward or front face of the floating sealing sleeve 24. Additionally, the sealing means 34, positioned in the space defined by the groove 28 in the sealing sleeve 24, and the internal shoulder 36 on the body member 10 are provided to seal between the interior of the bore in body member 10 and the exterior of the sealing sleeve 24. The area defined by the differences in the sealing diameters of the sealing means 32 and 34 at the rear end of sealing sleeve 24 will be exposed to ambient pressure without the coupling and to line pressure within the coupling. Thus a force will be created which urges the front faces of the sealing sleeves 24 together to reinforce the seal provided by the sealing means 32.

It should be noted that in FIGURE 1 the identical parts of the subassemblies B and C are given the same number with the lower case letter b following those parts on the subassembly B and the lower case letter c following the number of the parts in subassembly C.

With the form of the coupling illustrated in FIGURES 1 and 3, locking means are provided to maintain the engaging means in engagement with the other assembly. Such locking means is provided by the locking sleeve 38 which is positioned in surrounding relation to the exterior of the body member 10 and the fingers 14. The internal outwardly facing shoulder 40 is adapted to engage the shoulder 42 on the fingers 14 to limit the movement of the locking sleeve in the outward direction when the coupling subassemblies are not engaged. When the coupling subassemblies are engaged, shoulders 40 engage the ends 9 of fingers 14 to properly position area 52 over the balls 16 and prevent overriding of the sleeves 38. The spring 44 is positioned in surrounding relation to body member 10 and within locking sleeve 38. One end of the spring 44 is in engagement with internal shoulder 46 on locking sleeve 38 and the other end engages coller 48 which is retained in position surrounding body 10 by the snap ring 50.

The coupling assembly A is connected by the joining of the subassemblies B and C. To join the assemblies B and C, they are positioned whereby their fingers 14 face each other and the body portions are rotated slightly so that the fingers of one body member engage between the fingers of the other body member. To assemble the units, the locking sleeves 38 are pulled to the rear against the force of the spring 44 so that the inner surface 52 of locking sleeve 38 is out of engagement with the balls 16. In this position the fingers then slide over the opposite floating sealing sleeve member until the balls are positioned in the ball receiving groove 26. With the balls 16 positioned in the grooves 26 of the opposite sealing sleeve, the locking sleeves 38 are released and the springs 44 return the locking sleeves 38 to the position illustrated in FIGURE 1 wherein the inner surface 52 of each locking sleeve engages the balls 16 and forces them into the ball receiving groove 26 of the respective sealing sleeves 24. In this position the outer faces of the sealing sleeves 24 are positioned against each other with the sealing means 32 in engagement with each other and providing a pressure-tight seal with the sealing means 34.

When the coupling assembly A has been assembled and contains the pressure in the tubular members which it connects, such pressure will result in a force tending to pull the subassemblies apart and will be transmitted by the engaging means of one subassembly to the floating sleeve on the other subassembly. Thus internal pressure pulls the floating sleeve members toward each other to reinforce the coupling seal. The fingers 14b will pull the balls 16b in a direction to the left as illustrated in FIGURE 1 and such force will be exerted on the sealing sleeve 24c in a direction toward the sealing sleeve 24b. The pressure also produces similar forces on the body member 10c causing the sealing sleeve 24b to be forced toward the sealing sleeve 24c. The forcing together of the sealing sleeves 24b and 24c at their confronting faces will reinforce the seal provided by the sealing means 32b and 32c in the annular grooves 30b and 30c of the respective sealing sleeves. This cross engagement type of utilization of forces is a particular feature of the present invention.

With respect to the form of the invention illustrated in FIGURE 1 that there is an annular area defined between the diameter of the sealing point of sealing means 34 in the body 10 and the diameter of the seal provided between adjacent sealing means 32. The pressure contained within the coupling assembly A acts on such annular area at the ends of the sealing sleeves 24 to provide a force holding the two sealing sleeves together and thereby maintaining and reinforcing the seal provided by the sealing means 32. This configuration is one which provides a pressure energized seal for the coupling.

While the form of the invention illustrated in FIGURES 1 and 3 includes both forms of the utilization of the forces created by pressure to the pressure energized seal and the cross engagement between subassemblies, reinforce the seal of the coupling assembly, either form may be embodied in a coupling assembly separately to provide the desired utilization of pressure forces to maintain the seal in the coupling assembly.

The coupling assembly A is readily disconnected by retracting the locking sleeves 38b and 38c each a sufficient distance so that its inner surface 52 will be out of engagement with the balls 16. With the balls 16 free to move outwardly out of the ball receiving groove 26, a slight pull on the body members 10 will pull the units apart since the ball receiving grooves 26 have an angular surface which will cam the balls 16 outwardly as the fingers 14 are separated.

While the springs 44b and 44c are relatively light springs, they exert sufficient force urging the locking sleeves together so that they will not accidentally retract to allow the release of the balls 16 from the groove 26 in sealing sleeve 24. The force of springs 44b and 44c is light enough that locking sleeves may be moved apart readily to accomplish a disconnection of the subassemblies B and C.

In the event that it is desired to have a break-away unit, i.e., one in which the unit will release when the longitudinal force tending to separate the subassemblies of the coupling assembly reaches a certain point, then a configuration of the locking sleeve may be as illustrated in FIGURE 2. The locking sleeve 54 of FIGURE 2 is composed of three parts: the cylindrical member 56, the adjustable ring 58 and the locking ring 60. As shown, the ring 58 is threadedly engaged with the cylindrical member 56 and the locking ring 60 is also in threaded engagement therewith and is provided to be moved against the end of ring 58 when it has been properly positioned on cylindrical member 56 to lock the ring 58 in its proper position. The positioning of the ring 58 is with respect to the inner surface thereof which is provided with a taper portion 62 and a flat portion 64. As shown, the flat portion 64 is adapted to be positioned to engage the balls 16 of the fingers 14 on the opposite subassembly to hold the balls in the ball receiving groove 26 of the sealing sleeve 24 when it is not desired that the locking sleeve 54 act as a break-away unit. In the event that the unit is to break away responsive to a longitudinal force tending to move the subassemblies apart, the ring 58 is positioned to engage the balls on the tapered portion 62 of its inner surface whereby such force of the balls against the groove will be translated outwardly against the tapered surface 62 of the ring 58 which, when sufficient force develops to over come the spring force, will cause the ring 58 to retract to allow the balls 16 to move outwardly from engagement in the groove 26 whereby release of the subassemblies and the subsequent decoupling of the coupling assembly A is accomplished.

The coupling assembly F, as shown in FIGURE 4, illustrates another form of the present invention in which the floating members are pressure energized by the pressure within the coupling to provide a sealing force responsive to the pressure in the unit. The coupling assembly F includes two identical subassemblies G and H, each of which have a body member 64, a floating sealing sleeve member 65 and a locking sleeve 66. Each body member 64 is provided with suitable connecting means, such as the internal threads 67, by which the body member 64 may be connected to a tubular member (not shown). The body member 64 is provided with a bore 68 in communication with the threads 67 and extending to the enlarged bore 69 in which the floating sealing sleeve 65 is positioned. Each body member 64 is provided with interlocking means which, as shown, includes the neck portions connecting to engaging fingers 70 with suitable spaces 71 between such fingers to receive the engaging fingers of another body 64. The body members 64 are assembled by inserting the engaging fingers 70 of one body member into the spaces 71 of a second body member and rotating the body members so that each of the fingers 70 interlocks with one of the fingers 70 of the other body member.

Since it is desired in all couplings that once the body members are engaged some means be provided to maintain such engagement during all normal conditions to which the device is exposed, the locking means has been provided and an embodiment of a form of locking means is illustrated in FIGURE 4. This locking means includes the locking sleeves 66, which are provided with alternate projections 80 and recesses 81 which interengage to prevent rotational movement of one sleeve with respect to the other; the projection 72 around the body member 64; the resilient means, such as the rubber sleeve 73, urging the sleeve 66 in a direction toward a mating subassembly; and means, such as pins 74, which are provided in each body member to orient the locking sleeve with its respective body member. The pins 74 engage in slots 75 in the locking sleeve 66 to allow relative longitudinal movement of the locking sleeve with respect to the body member while preventing rotational movement between such members. The inner ends of the pins 74 extend into the outer groove 76 on sealing sleeve 65 to retain the sealing sleeve 65 within the enlarged bore 69.

The sealing sleeves 65 are adapted to receive the sealing means 77 whereby each sealing means 77 will be positioned to seal against its sealing sleeve and also against sealing means of the other sealing sleeve. Sealing means 78 is provided with each sealing sleeve 65 to provide a seal between the outer periphery of the sealing sleeve and the interior of the body member.

With the sealing means 77 and 78 so placed, the seal between adjacent sealing sleeves will be pressure energized; that is, the pressure in the coupling will be exerted against the inner end of each of the sealing sleeves and not against their outer ends and will thereby provide a force pushing the sealing sleeves 65 together which assist in maintaining the seal between sealing sleeves.

With respect to FIGURE 2 only the modified portions of the locking sleeve 54 have been shown, it being understood that the remaining portions of the unit will be as shown in FIGURE 1.

From the foregoing it can be seen that the coupling of the present invention utilizes forces on the coupling tending to separate it as a force to maintain the seal of the coupling. Forces such as those developed by the pressure are utilized to provide a pressure energized seal, and also forces exerted in a longitudinal direction on the coupling which tend to separate the coupling are also used to maintain the seal of the unit. In one form of the coupling assembly the forces of both of the above types are used to improve and maintain the seal of the unit. In the illustrated forms of the coupling of the present invention, as such forces are increased the sealing forces will commensurately be increased. Further, the coupling assembly of the present invention may be composed of two identical subassemblies, each including a body member, a floating sealing member and means providing engagement between the two subassemblies with the sealing member being energized by forces exerted on the coupling assembly.

What is claimed is:

1. A coupling assembly comprising,
a pair of identical subassemblies comprising,
body members each having a bore therethrough,
a sleeve member in each of said bores mounted for limited axial movement,
means providing a seal between each sleeve member and its associated body while permitting relative axial movement therebetween,
the confronting faces of said sleeve members when engaged providing a seal,
engaging means on each body for releasably engaging the sleeve member of the other subassembly to lock the subassemblies together and for urging said sleeve members toward each other in response to pressure of a fluid contained in said coupling assembly, and
means holding said engaging means engaged when in one position and permitting release of said engaging means when in a second position.

2. A coupling comprising,
a pair of tubular body members each having a bore therethrough,
a floating sealing sleeve installed in the bore of each of said body members and being free to move longitudinally of said body member a limited distance,
means sealing between each of said sealing sleeves and said body members, means sealing between said sealing sleeves when said body member are connected, and means on each body member adapted to releasably engage the sealing sleeve installed in the other body member, said engaging means urging said sealing sleeves toward each other responsive to pressures within said coupling assembly.

3. A coupling according to claim 2 including, adjustable means associated with said engaging means providing for release of said engaging means when forces tending to pull said body members apart exceed a predetermined force.

4. A coupling according to claim 2 wherein, said engaging means includes a plurality of balls carried by said body members, said balls engaging in a ball receiving groove in the opposite sealing sleeve when said body members are connected, and a locking sleeve mounted on each body member releasably holding the balls of the opopsite body member in the groove in the sealing sleeve.

5. A coupling according to claim 4 wherein, said locking sleeve includes a tapered surface positioned over said balls and holding the balls engaged, resilient means urging the tapered surface into engagement with the balls, said balls effective against said tapered surface to move the sleeve against the resilient means and release the balls when the forces tending to part the coupling reach a selected value.

6. A coupling according to claim 4 wherein said locking sleeve includes, a cylindrical member, a ring having an inner tapered surface and an inner flat surface, resilient means urging said locking sleeve to the front of said body member with which it is associated, said ring being threadedly engaged with said cylindrical member whereby the position of said ring with respect to said cylindrical member may be adjusted to position the desired portion of said inner surface of said ring in engagement with said balls, and a locking ring being threadedly engaged with said cylindrical member and adapted to lock said ring in position with respect to said cylindrical member so that said balls when in engagement with said inner tapered surface of said ring may retract said locking sleeve responsive to a force sufficient to overcome the force of said resilient means and disconnect said coupling.

7. A coupling comprising, a pair of tubular body members each having an internal bore, the front end of said body members including a plurality of circumferentially spaced apart fingers, each of said fingers containing a movable element, a floating sealing sleeve installed in each of said body members, a groove in each of said floating sleeve elements adapted to receive said movable elements, each of said sealing sleeves having a first sealing means for sealing against the body member in which it is installed and a second sealing means adapted to seal against the second sealing means of the other sealing sleeve, and means on each body member adapted to allow said fingers to be interengaged and to hold said movable elements in said fingers in engagement with the groove in the sealing sleeve within the bore of the other body member so that pressure within the coupling is transmitted by said fingers and said movable elements to said sealing sleeves to urge said sealing sleeves toward each other.

8. A coupling comprising, a pair of body members, each having a bore therethrough, means on one end of each of said body members to connect to one of the tubular members to be joined by said coupling, the opposite ends of said body members having fingers extending longitudinally outwardly from said body members, said fingers being spaced apart to receive a finger of another body member between each finger whereby the fingers of said pair will mate when in engagement, a ball mounted in each of said fingers and adapted to move with respect to said finger in a radial direction, means securing said balls in said fingers, a floating sealing sleeve position within the bore of the finger end of each of said body members, sliding seal means between each sleeve and its associated body, the exterior of said sleeve being grooved to receive the balls of the fingers of a mating body member, a locking sleeve on each of said body members surrounding said fingers, said locking sleeve having an inner cam surface adapted to force the balls carried by one body member into locking contact in the groove of said sealing sleeve of the other body member, and sealing means in the face of said sealing sleeve adapted to engage such sealing means of a sealing sleeve of a mating body member so that when two mating body members are jointed together to form a coupling any longitudinal force tending to pull the body members apart will be transmitted through the respective fingers and balls to the oposite sealing sleeve to force said sealing sleeves together and thereby maintain an effective seal.

References Cited

UNITED STATES PATENTS

| | | | |
|---|---|---|---|
| 2,816,779 | 12/1957 | Jensen. | |
| 2,860,893 | 11/1958 | Clark | 285—277 X |
| 3,097,867 | 7/1963 | Saloum | 285—86 |
| 3,168,335 | 2/1965 | Sumption | 285—70 |
| 3,177,011 | 4/1965 | Ogne | 285—70 |
| 3,195,931 | 7/1965 | Braunagel | 285—70 |
| 3,201,151 | 8/1965 | Westveer | 285—73 |

CARL W. TOMLIN, *Primary Examiner.*

R. G. BERKLEY, *Assistant Examiner.*